(12) United States Patent
Hinoue et al.

(10) Patent No.: US 7,876,530 B2
(45) Date of Patent: *Jan. 25, 2011

(54) MAGNETIC RECORDING MEDIUM HAVING A COBALT-BASED ALLOY FILM FOR HIGH DENSITY RECORDING AND MAGNETIC STORAGE DEVICE USING SAME

(75) Inventors: Tatsuya Hinoue, Kanagawa (JP); Yotsuo Yahisa, Kanagawa (JP); Tomoo Yamamoto, Kanagawa (JP); Jo Inagaki, Kanagawa (JP); Hiroyuki Suzuki, Kanagawa (JP); Masae Suzuki, legal representative, Fugisawa (JP); Hidekazu Kashiwase, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/387,164

(22) Filed: Apr. 28, 2009

(65) Prior Publication Data

US 2009/0258253 A1 Oct. 15, 2009

Related U.S. Application Data

(63) Continuation of application No. 11/317,344, filed on Dec. 22, 2005, now Pat. No. 7,545,604.

(30) Foreign Application Priority Data

Dec. 24, 2004 (JP) .............................. 2004-372388

(51) Int. Cl.
*G11B 5/66* (2006.01)
*B32B 3/02* (2006.01)

(52) U.S. Cl. ...................... 360/135; 428/827; 428/829; 428/832.2

(58) Field of Classification Search ................. 360/135; 428/827, 829, 832.2
See application file for complete search history.

(56) References Cited

U.S. PATENT DOCUMENTS 6,150,015 A 11/2000 Bertero et al.
(Continued)

FOREIGN PATENT DOCUMENTS

JP 07-134820 5/1995
JP 11-283230 10/1999

OTHER PUBLICATIONS

Office Action for U.S. Appl. No. 11/317,344, dated Apr. 8, 2008.
Office Action for U.S. Appl. No. 11/317,344, dated Oct. 1, 2008.
Notice of Allowability for U.S. Appl. No. 11/317,344, dated Feb. 6, 2009.

*Primary Examiner*—Jefferson Evans
(74) *Attorney, Agent, or Firm*—Zilka-Kotab, PC

(57) ABSTRACT

In one embodiment, a magnetic recording medium comprises an underlying film, a magnetic film and a protective film formed in this order on a substrate. The magnetic film is a cobalt-base alloy film containing chromium and has a plurality of magnetic layers stacked without interposition of any non-magnetic layer. The plural magnetic layers comprise first, second and third magnetic layers. The first magnetic layer is disposed between the underlying film and the second magnetic layer. The second magnetic layer is disposed between the first magnetic layer and the third magnetic layer. The third magnetic layer is disposed between the second magnetic layer and the protective film. The concentration of chromium contained in the first magnetic layer is lower than that of chromium contained in the second magnetic layer. The thickness of the first magnetic layer is smaller than that of the second magnetic layer. The magnetic layers which overlie the first magnetic layer further contain platinum and boron. The concentration of chromium contained in the third magnetic layer is lower than that of chromium contained in the second magnetic layer.

19 Claims, 12 Drawing Sheets

U.S. PATENT DOCUMENTS

| | | |
|---|---|---|
| 7,226,674 B2 | 6/2007 | Koda et al. |
| 7,300,713 B2 | 11/2007 | Bian et al. |
| 2002/0064689 A1* | 5/2002 | Yamanaka et al. .... 428/694 TM |
| 2002/0136929 A1 | 9/2002 | Oikawa et al. |
| 2002/0160234 A1* | 10/2002 | Sakawaki et al. ...... 428/694 TS |
| 2003/0017370 A1 | 1/2003 | Shimizu et al. |
| 2003/0104253 A1* | 6/2003 | Osawa et al. .......... 428/694 TM |
| 2004/0213949 A1* | 10/2004 | Umezawa et al. .......... 428/65.3 |
| 2004/0253486 A1* | 12/2004 | Chen et al. ............. 428/694 TS |
| 2007/0275269 A1* | 11/2007 | Takahoshi et al. ......... 428/828.1 |
| 2008/0113225 A1* | 5/2008 | Tanahashi et al. ........... 428/830 |
| 2009/0104346 A1* | 4/2009 | Lee et al. .................... 427/131 |
| 2009/0226763 A1* | 9/2009 | Oka .......................... 428/829 |

* cited by examiner

Fig. 2

| HEAD No. | HF (kFC/mm) | Iw (mA) | Is (mA) | Tww (μm) | Twr (μm) | Skew (deg.) | ROTNUM (s⁻¹) |
|---|---|---|---|---|---|---|---|
| 1 | 35.8 | 37 | 2.6 | 0.32 | 0.24 | 0 | 70 |
| 2 | 35.8 | 37 | 2.6 | 0.28 | 0.24 | 0 | 70 |
| 3 | 35.8 | 37 | 2.6 | 0.27 | 0.22 | 0 | 70 |
| 4 | 31.3 | 30 | 3.2 | 0.28 | 0.20 | -14.8 | 167 |
| 5 | 35.8 | 37 | 2.6 | 0.32 | 0.26 | 0 | 70 |
| 6 | 35.8 | 37 | 2.6 | 0.33 | 0.24 | 0 | 70 |
| 7 | 35.8 | 37 | 2.6 | 0.29 | 0.24 | 0 | 70 |
| 8 | 35.8 | 37 | 2.6 | 0.31 | 0.29 | 0 | 70 |
| 9 | 35.8 | 37 | 2.6 | 0.29 | 0.22 | 0 | 70 |
| 10 | 35.8 | 37 | 2.6 | 0.30 | 0.25 | 0 | 70 |

Fig. 3

| SAMPLE No. | MAGLAY1 COMP (at.%) | TH1 (nm) | MAGLAY3 COMP (at.%) | TH3 (nm) | Brt (Tnm) | Hcr (kA/m) | KV/kT | PW50 (nm) | O/W (-dB) | xNdhf | Smf/N (dB) | logBER |
|---|---|---|---|---|---|---|---|---|---|---|---|---|
| 101 | Co-16Cr-9Pt | 3.0 | Co-12Cr-13Pt-12B | 9 | 7.7 | 226 | 142 | 105 | 29 | 0.024 | 11.0 | -2.8 |
| 102 | " | 2.5 | " | " | 7.2 | 240 | 132 | 104 | 29 | 0.023 | 11.7 | -3.0 |
| 103 | " | 2.0 | " | " | 6.7 | 267 | 116 | 102 | 29 | 0.021 | 12.6 | -3.6 |
| 104 | " | 1.5 | " | " | 6.2 | 304 | 105 | 99 | 29 | 0.020 | 13.3 | -4.3 |
| 105 | " | 1.2 | " | " | 5.9 | 329 | 99 | 98 | 28 | 0.021 | 13.6 | -4.3 |
| 106 | " | 1.0 | " | " | 5.7 | 341 | 97 | 97 | 29 | 0.021 | 13.4 | -4.2 |
| 107 | " | 0.8 | " | " | 5.6 | 348 | 93 | 97 | 28 | 0.021 | 13.1 | -3.8 |
| 108 | " | 0.6 | " | " | 5.4 | 340 | 89 | 98 | 28 | 0.023 | 12.4 | -3.3 |
| 109 | " | 3.0 | Co-18Cr-13Pt-8B | 10 | 7.9 | 222 | 132 | 109 | 28 | 0.023 | 10.4 | -2.2 |
| 110 | " | 2.5 | " | " | 7.4 | 229 | 125 | 108 | 29 | 0.021 | 11.3 | -2.9 |
| 111 | " | 2.0 | " | " | 6.9 | 252 | 114 | 106 | 29 | 0.020 | 12.4 | -3.4 |
| 112 | " | 1.5 | " | " | 6.3 | 286 | 99 | 103 | 29 | 0.018 | 13.2 | -4.1 |
| 113 | " | 1.2 | " | " | 6.1 | 305 | 97 | 101 | 29 | 0.019 | 13.1 | -4.2 |
| 114 | " | 1.0 | " | " | 5.9 | 316 | 98 | 101 | 29 | 0.020 | 13.0 | -3.8 |
| 115 | " | 0.8 | " | " | 5.9 | 322 | 92 | 100 | 28 | 0.020 | 12.9 | -3.7 |
| 116 | " | 0.6 | " | " | 5.7 | 315 | 88 | 99 | 30 | 0.021 | 12.2 | -3.3 |
| 117 | " | 3.0 | Co-12Cr-12Pt-10B-2Cu | 10 | 7.8 | 222 | 137 | 105 | 28 | 0.026 | 10.4 | -2.2 |
| 118 | " | 2.5 | " | " | 7.1 | 233 | 126 | 102 | 29 | 0.024 | 11.6 | -2.9 |
| 119 | " | 2.0 | " | " | 6.6 | 258 | 110 | 102 | 29 | 0.022 | 12.4 | -3.5 |
| 120 | " | 1.5 | " | " | 6.1 | 291 | 99 | 99 | 29 | 0.021 | 13.1 | -4.0 |
| 121 | " | 1.2 | " | " | 5.9 | 313 | 95 | 98 | 30 | 0.020 | 13.0 | -4.0 |
| 122 | " | 1.0 | " | " | 5.7 | 323 | 91 | 98 | 30 | 0.022 | 13.0 | -3.8 |
| 123 | " | 0.8 | " | " | 5.6 | 330 | 88 | 97 | 29 | 0.023 | 12.7 | -3.7 |
| 124 | " | 0.6 | " | " | 5.4 | 319 | 85 | 97 | 30 | 0.025 | 12.0 | -3.3 |

Fig. 4

| SAMPLE No. | MAGLAY1 COMP (at.%) | TH1 (nm) | SUBTEMP (°C) | Br·t (T·nm) | Hcr (kA/m) | KV/kT | PW50 (nm) | O/W (-dB) | kNdhf | Smf/N (dB) | logBER |
|---|---|---|---|---|---|---|---|---|---|---|---|
| 201 | Co-16Cr-9Pt | 0.8 | 390 | 5.6 | 361 | 92 | 104 | 29 | 0.020 | 13.4 | -5.2 |
| 202 | 〃 | 〃 | 400 | 5.7 | 377 | 96 | 104 | 28 | 0.021 | 13.3 | -5.2 |
| 203 | 〃 | 〃 | 410 | 5.7 | 383 | 102 | 104 | 29 | 0.021 | 13.4 | -5.0 |
| 204 | Co-34Cr | 2.0 | 360 | 5.5 | 377 | 99 | 105 | 28 | 0.022 | 12.2 | -4.6 |
| 205 | 〃 | 1.5 | 〃 | 5.3 | 370 | 90 | 104 | 30 | 0.022 | 12.6 | -4.6 |
| 206 | 〃 | 1.0 | 〃 | 5.2 | 339 | 76 | 104 | 31 | 0.023 | 12.0 | -4.0 |

Fig. 5

| SAMPLE No. | MAGLAY1 COMP (at.%) | TH1(nm) | Brt (Tnm) | Hcr (kA/m) | KV/kT | PW50 (nm) | O/W (-dB) | kNdhf | Smf/N (dB) | logBER |
|---|---|---|---|---|---|---|---|---|---|---|
| 301 | Co-10Cr | 0.8 | 5.6 | 360 | 94 | 108 | 29 | 0.020 | 13.8 | -5.2 |
| 302 | " | 1.2 | 6.2 | 319 | 100 | 111 | 30 | 0.020 | 13.5 | -5.3 |
| 303 | " | 1.6 | 6.7 | 284 | 100 | 114 | 31 | 0.021 | 13.0 | -4.9 |
| 304 | Co-14Cr | 0.8 | 5.8 | 363 | 92 | 109 | 28 | 0.021 | 13.4 | -4.9 |
| 305 | " | 1.2 | 6.1 | 345 | 105 | 110 | 28 | 0.020 | 13.7 | -5.3 |
| 306 | " | 1.6 | 6.4 | 316 | 104 | 112 | 30 | 0.018 | 14.3 | -5.2 |
| 307 | Co-27Cr | 0.8 | 5.6 | 347 | 84 | 111 | 28 | 0.024 | 11.7 | -3.6 |
| 308 | " | 1.2 | 5.5 | 372 | 98 | 112 | 27 | 0.024 | 12.0 | -3.9 |
| 309 | " | 1.6 | 5.5 | 368 | 97 | 111 | 28 | 0.023 | 12.2 | -4.1 |
| 310 | Co-14Cr-4Pt | 0.8 | 5.6 | 367 | 88 | 108 | 28 | 0.021 | 13.3 | -5.2 |
| 311 | " | 1.2 | 5.8 | 346 | 97 | 109 | 28 | 0.020 | 14.0 | -5.6 |
| 312 | " | 1.6 | 6.3 | 309 | 102 | 112 | 30 | 0.020 | 13.6 | -5.4 |
| 313 | Co-14Cr-8Pt | 0.8 | 5.7 | 360 | 88 | 109 | 28 | 0.021 | 13.4 | -4.9 |
| 314 | " | 1.2 | 6.0 | 349 | 94 | 110 | 28 | 0.020 | 13.8 | -5.5 |
| 315 | " | 1.6 | 6.4 | 311 | 103 | 112 | 29 | 0.020 | 13.7 | -5.3 |
| 316 | Co-14Cr-12Pt | 0.8 | 5.5 | 350 | 83 | 110 | 28 | 0.022 | 13.1 | -4.6 |
| 317 | " | 1.2 | 5.9 | 349 | 91 | 110 | 28 | 0.020 | 13.4 | -4.9 |
| 318 | " | 1.6 | 6.3 | 306 | 101 | 113 | 29 | 0.020 | 13.3 | -4.7 |
| 319 | Co-19Cr-8Pt | 0.8 | 5.7 | 355 | 85 | 110 | 28 | 0.021 | 12.8 | -4.3 |
| 320 | " | 1.2 | 6.0 | 361 | 94 | 110 | 27 | 0.020 | 13.6 | -5.0 |
| 321 | " | 1.6 | 6.2 | 341 | 96 | 110 | 28 | 0.019 | 13.8 | -5.2 |

Fig. 6

| SAMPLE No. | MAGLAY1 COMP (at.%) | TH1 (nm) | Brt (Tnm) | Hcr (kA/m) | KV/kT | O/W (-dB) | kNdhf | Smf/N (dB) | logBER |
|---|---|---|---|---|---|---|---|---|---|
| 401 | Co-14Cr | 1.5 | 5.9 | 323 | 88 | 30 | 0.018 | 14.8 | -5.0 |
| 402 | " | 1.2 | 5.7 | 337 | 86 | 29 | 0.018 | 14.6 | -4.8 |
| 403 | " | 1 | 5.8 | 336 | 86 | 30 | 0.018 | 14.8 | -4.8 |
| 404 | " | 0.8 | 5.6 | 351 | 89 | 30 | 0.019 | 14.7 | -4.5 |
| 405 | Co-16Cr | 1.5 | 6.0 | 322 | 87 | 30 | 0.018 | 14.3 | -4.7 |
| 406 | " | 1.2 | 5.7 | 338 | 88 | 28 | 0.018 | 14.8 | -4.7 |
| 407 | " | 1.0 | 5.6 | 340 | 84 | 28 | 0.018 | 14.9 | -4.8 |
| 408 | " | 0.8 | 5.7 | 358 | 86 | 27 | 0.019 | 14.4 | -4.3 |
| 409 | Co-18Cr | 1.5 | 6.3 | 323 | 92 | 31 | 0.018 | 14.5 | -4.6 |
| 410 | " | 1.2 | 5.9 | 331 | 92 | 29 | 0.018 | 14.1 | -4.8 |
| 411 | " | 1.0 | 5.7 | 344 | 88 | 29 | 0.018 | 14.7 | -4.9 |
| 412 | " | 0.8 | 5.6 | 348 | 87 | 30 | 0.018 | 14.7 | -4.8 |
| 413 | Co-20Cr | 1.5 | 6.0 | 339 | 86 | 29 | 0.018 | 14.7 | -4.6 |
| 414 | " | 1.2 | 5.8 | 346 | 85 | 28 | 0.018 | 14.9 | -4.7 |
| 415 | " | 1.0 | 5.7 | 346 | 89 | 28 | 0.018 | 15.1 | -4.5 |
| 416 | " | 0.8 | 5.5 | 351 | 82 | 28 | 0.019 | 14.7 | -4.4 |
| 417 | Co-14Cr-4Pt | 1.0 | 5.9 | 327 | 86 | 28 | 0.018 | 14.7 | -5.5 |
| 418 | " | 1.2 | 6.2 | 308 | 91 | 28 | 0.019 | 14.2 | -5.2 |
| 419 | " | 1.5 | 6.5 | 288 | 91 | 29 | 0.019 | 13.8 | -5.2 |
| 420 | " | 1.8 | 7.0 | 261 | 99 | 29 | 0.021 | 13.4 | -4.7 |
| 421 | Co-16Cr-4Pt | 1.0 | 5.7 | 341 | 83 | 29 | 0.018 | 14.9 | -5.3 |
| 422 | " | 1.2 | 5.9 | 329 | 88 | 29 | 0.019 | 14.4 | -5.4 |
| 423 | " | 1.5 | 5.9 | 314 | 88 | 30 | 0.018 | 14.4 | -5.4 |
| 424 | " | 1.8 | 6.4 | 289 | 93 | 29 | 0.020 | 14.0 | -5.2 |
| 425 | Co-16Cr-9Pt | 1.7 | 6.5 | 302 | 89 | 28 | 0.018 | 14.4 | -5.4 |
| 426 | " | 1.2 | 6.2 | 326 | 86 | 29 | 0.018 | 14.7 | -5.4 |

Fig. 7

| SAMP No. | MAGLAY1 COMP (at.%) | TH1 (nm) | Brt (Tnm) | Hcr (kA/m) | KV/kT | PW50 (nm) | O/W (-dB) | kHdhf | Smf/N (dB) | logBER |
|---|---|---|---|---|---|---|---|---|---|---|
| 501 | Co-18Cr-9Pt | 1.6 | 5.9 | 328 | 85 | 99 | 29 | 0.018 | 14.3 | -4.8 |
| 502 | " | 1.2 | 5.7 | 345 | 81 | 98 | 28 | 0.019 | 14.1 | -4.4 |
| 503 | Co-40Ru | 2.0 | 5.4 | 337 | 85 | 97 | 31 | 0.020 | 13.1 | -3.9 |
| 504 | " | 1.6 | 5.4 | 339 | 86 | 98 | 31 | 0.021 | 12.8 | -3.7 |
| 505 | " | 1.2 | 5.2 | 328 | 81 | 98 | 31 | 0.022 | 12.1 | -3.1 |
| 506 | " | 0.8 | 5.0 | 322 | 77 | 99 | 32 | 0.024 | 11.4 | -2.7 |
| 507 | Co-50Ru | 2.0 | 4.8 | 304 | 74 | 99 | 34 | 0.022 | 12.1 | -3.1 |
| 508 | " | 1.6 | 4.8 | 306 | 75 | 100 | 34 | 0.022 | 12.0 | -2.9 |
| 509 | " | 1.2 | 4.7 | 299 | 71 | 100 | 34 | 0.023 | 11.6 | -2.5 |
| 510 | " | 0.8 | 4.5 | 288 | 71 | 98 | 35 | 0.025 | 10.7 | -2.2 |
| 511 | Co-40Ru-3B | 2.0 | 5.2 | 311 | 79 | 98 | 32 | 0.020 | 12.5 | -3.4 |
| 512 | " | 1.6 | 5.1 | 309 | 78 | 98 | 32 | 0.021 | 12.2 | -3.3 |
| 513 | " | 1.2 | 4.8 | 293 | 70 | 99 | 34 | 0.023 | 11.9 | -2.6 |
| 514 | " | 0.8 | 4.6 | 282 | 70 | 99 | 34 | 0.024 | 11.2 | -2.1 |
| 515 | Co-24Ru-14B | 2.0 | 1.0 | 476 | — | — | — | — | — | — |
| 516 | " | 1.6 | 1.9 | 138 | — | — | — | — | — | — |
| 517 | " | 1.2 | 2.0 | 146 | — | — | — | — | — | — |
| 518 | " | 0.8 | 1.8 | 185 | — | — | — | — | — | — |
| 519 | Co-26Ru-10B | 2.0 | 4.4 | 195 | — | — | — | — | — | — |
| 520 | " | 1.6 | 4.4 | 201 | — | — | — | — | — | — |
| 521 | " | 1.2 | 4.3 | 206 | — | — | — | — | — | — |
| 522 | " | 0.8 | 3.9 | 202 | — | — | — | — | — | — |
| 523 | Co-20Cr-30Ru | 2.0 | 2.1 | 271 | — | — | — | — | — | — |
| 524 | " | 1.6 | 1.9 | 253 | — | — | — | — | — | — |
| 525 | " | 1.2 | 1.4 | 260 | — | — | — | — | — | — |
| 526 | " | 0.8 | 1.1 | 320 | — | — | — | — | — | — |
| 527 | Co-20Cr-40Ru | 2.0 | 1.8 | 258 | — | — | — | — | — | — |
| 528 | " | 1.6 | 1.5 | 283 | — | — | — | — | — | — |
| 529 | " | 1.2 | 1.2 | 452 | — | — | — | — | — | — |
| 530 | " | 0.8 | 0.8 | 641 | — | — | — | — | — | — |

Fig. 8

| SAMPLE No. | MAGLAY2 COMP (at%) | TH2 (nm) | MAGLAY3 COMP (at%) | TH3 (nm) | SUB TEMP (°C) | Br·t (Tnm) | Hcr (kA/m) | KV/kT | PW50 (nm) | O/W (-dB) | kNdHf | Smf/N (dB) | logBER |
|---|---|---|---|---|---|---|---|---|---|---|---|---|---|
| 601 | Co-22Cr-14Pt-4B-2Ta | 9.2 | Co-12Cr-13Pt-12B | 8.3 | 370 | 8.2 | 364 | 100 | 97 | 27 | 0.020 | 14.3 | -4.9 |
| 602 | " | 10.7 | " | 7.7 | " | 8.2 | 331 | 101 | 99 | 28 | 0.019 | 14.3 | -5.1 |
| 603 | " | 12.1 | " | 7.1 | " | 8.2 | 301 | 103 | 99 | 28 | 0.019 | 14.3 | -4.9 |
| 604 | Co-22Cr-14Pt-8B-2Ta | 8.3 | " | 9.1 | " | 6.1 | 371 | 88 | 97 | 27 | 0.019 | 14.3 | -5.0 |
| 605 | " | 10.2 | " | 8.5 | " | 6.1 | 339 | 88 | 97 | 28 | 0.019 | 14.4 | -5.1 |
| 606 | " | 11.9 | " | 7.9 | " | 6.2 | 301 | 88 | 98 | 28 | 0.019 | 14.4 | -4.9 |

Fig. 9

| SAMPLE No. | MAGLAY2 COMP (at%) | TH2 (nm) | MAGLAY3 COMP (at%) | TH3 (nm) | SUB TEMP (°C) | Br·t (Tnm) | Hcr (kA/m) | KV/kT | PW50 (nm) | O/W (-dB) | kNdHf | Smf/N (dB) | logBER |
|---|---|---|---|---|---|---|---|---|---|---|---|---|---|
| 601 | Co-22Cr-14Pt-4B-2Ta | 9.2 | Co-12Cr-13Pt-12B | 8.3 | 370 | 8.2 | 364 | 100 | 98 | 28 | 0.020 | 14.2 | -4.7 |
| 602 | " | 10.7 | " | 7.7 | " | 8.2 | 331 | 101 | 98 | 29 | 0.020 | 14.2 | -4.5 |
| 603 | " | 12.1 | " | 7.1 | " | 8.2 | 301 | 103 | 97 | 29 | 0.019 | 14.3 | -4.6 |
| 613 | Co-24Cr-14Pt-6B | 8.6 | " | 8.5 | " | 6.0 | 382 | 85 | 98 | 27 | 0.020 | 14.2 | -4.6 |
| 614 | " | 10.8 | " | 7.7 | " | 6.1 | 358 | 89 | 98 | 27 | 0.020 | 14.2 | -4.5 |
| 615 | " | 12.5 | " | 6.9 | " | 6.2 | 315 | 88 | 96 | 28 | 0.019 | 14.4 | -4.4 |
| 616 | Co-22Cr-14Pt-6B | 9.1 | " | 8.1 | " | 6.0 | 377 | 80 | 95 | 26 | 0.020 | 14.1 | -4.4 |
| 617 | " | 11.0 | " | 7.3 | " | 6.1 | 348 | 80 | 99 | 27 | 0.019 | 14.2 | -4.5 |
| 618 | " | 12.8 | " | 6.5 | " | 6.1 | 309 | 75 | 96 | 28 | 0.019 | 14.2 | -4.2 |

[Table illegible at available resolution]

MAGNETIC RECORDING MEDIUM HAVING A COBALT-BASED ALLOY FILM FOR HIGH DENSITY RECORDING AND MAGNETIC STORAGE DEVICE USING SAME

CROSS-REFERENCES TO RELATED APPLICATIONS

This application claims priority from Japanese Patent Application No. JP2004-372388, filed Dec. 24, 2004, the entire disclosure of which is incorporated herein by reference.

BACKGROUND OF THE INVENTION

The present invention relates to a magnetic recording medium for attaining high-density magnetic recording and a magnetic storage device combined with a magnetic storage head.

The demand for a larger capacity magnetic disk drive is becoming more and more keen. To meet this demand it is required to develop a magnetic head of high sensitivity and a magnetic recording medium having a high S/N ratio. To improve the S/N ratio of a magnetic recording medium it is necessary to improve the read output for high-density recording. Generally, the magnetic recording medium comprises a first underlying layer called a seed layer formed on a substrate, a second underlying layer of a body-centered cubic structure formed of an alloy containing chromium as a main component, a magnetic film, and a protective film containing carbon as a main component. The magnetic film is formed of an alloy with a hexagonal close-packed structure containing cobalt as a main component. To improve the read output it is effective to let the magnetic film have a crystal orientation such that (110) plane or (100) plane is nearly parallel to the substrate surface and let the c-axis of the hexagonal close-packed structure be an axis of easy magnetization facing in the in-plane direction. It is known that the crystal orientation of the magnetic film can be controlled by the seed layer. As a technique for attaining both thermal stability and low noise there is disclosed in Patent Literature 1 (Japanese Patent Laid-open No. 7-134820 (p. 3)) a magnetic recording medium wherein an underlying layer is formed on a substrate and at least two magnetic layers of different compositions are formed in contact with each other on the underlying layer to constitute a laminated magnetic film, the laminated magnetic film being provided in multiple layers through a non-magnetic layer such as a ruthenium layer. As a technique for improving the crystallographic orientation of a magnetic layer there is disclosed in Patent Literature 2 (U.S. Pat. No. 6,150,015) a magnetic thin film having an ultra-thin nucleating layer formed of a Co—Cr-base alloy deposited at a low deposition rate of not higher than 1 Å/sec. and a recording layer formed of a Co—Cr—Pt-base magnetic alloy deposited at a high deposition rate. As a technique for improving the output characteristic of a magnetic recording medium there is disclosed in Patent Literature 3 (Japanese Patent No. 3576372) a magnetic recording medium comprising a non-magnetic underlying film, a magnetic film and a protective film formed in this order on a substrate, the non-magnetic underlying film being formed of a Cr or Cr alloy, the magnetic film comprising a plurality of magnetic layers of a Co alloy containing Cr, the magnetic layers having Cr contents which become gradually lower from lower to upper magnetic layers.

BRIEF SUMMARY OF THE INVENTION

As a result of studies made by the present inventors it turned out that there were the following problems in the prior art. Improving the read output and also reducing the noise of a recording medium are important for improving the S/N ratio of the recording medium. To reduce the recording medium noise it is effective to form multiple layers, make the grain size microfine and decrease Brt. Brt is the product of remanence (Br) and the thickness (t) of magnetic layers. However, making the grain size microfine and decreasing Brt both to an extreme degree would cause deterioration of the thermal stability and thus a limit is encountered in the reduction of noise. Therefore, it is also necessary to study the higher coercivity of the recording medium. By making the coercivity high, it is possible to improve a half-value width PW50 of an isolated read wave output, but there arises a problem in that the overwrite characteristic may be deteriorated.

According to the technique disclosed in Patent Literature 1, Brt can be set low while maintaining the magnetic film thickness large in comparison with a recording medium formed by a single magnetic layer. However, it is still insufficient to attain a surface recording density of 95 Mbit or more per square millimeter. Thus, it is necessary to further improve the read output and decrease the recording medium noise.

In Patent Literature 2, the crystallographic orientation of a magnetic layer can be enhanced, but the effect of improving the crystallographic orientation by decreasing the film deposition rate is less significant and it is insufficient to attain a surface recording density of 95 Mbit or more per square millimeter of film. Thus, it is necessary to improve the read output and decrease the recording medium noise. The film formation using a low deposition rate of 1 Å/sec. or less is not realistic from the standpoint of productivity and discharge stability.

In Patent Literature 3, although the output characteristic is enhanced, it is insufficient to attain a surface recording density of 95 Mbit or more per square millimeter. It is necessary to optimize the composition and thickness of the magnetic layer formed in contact with the underlying layer and improve the crystallographic orientation of the magnetic layer and make crystal grains microfine, thereby reducing the recording medium noise.

It is a feature of the present invention to provide a longitudinal magnetic recording medium having a high recording medium S/N ratio, nonproblematic overwrite characteristics, a superior bit error rate and full stability to thermal fluctuation. It is another feature of the present invention to provide a highly reliable magnetic storage device which, when combined with a magnetic head of high sensitivity, can attain a surface recording density of 95 Mbit or more per square millimeter. In particular, the present invention aims at obtaining a composition and thickness of a magnetic film optimum for improving the output characteristic while reducing noise in a recording medium.

Typical modes of the invention as disclosed herein will now be outlined. A magnetic recording medium of the invention includes an underlying film, a magnetic film and a protective film, which are formed in this order on a substrate. The magnetic film is a cobalt-base alloy film containing chromium and includes a plurality of magnetic layers which are stacked without interposition of a non-magnetic layer. The plurality of magnetic layers comprise first, second and third magnetic layers, the first magnetic layer being disposed between the underlying film and the second magnetic layer, the second magnetic layer being disposed between the first and third magnetic layers, the third magnetic layer being disposed between the second magnetic layer and the protective film. The concentration of chromium contained in the first magnetic layer is lower than that of chromium contained in the second magnetic layer, and the thickness of the first magnetic layer is smaller than that of the second magnetic layer. The second and third magnetic layers each further contain platinum and boron, and the concentration of chromium contained in the third magnetic layer is set to a level lower than that of chromium contained in the second magnetic layer. Preferably, the thickness of the first magnetic layer is set at a value of not smaller than about 0.8 nm and not larger than about 2.0 nm.

According to the present invention it is possible to provide a longitudinal magnetic recording medium having a high recording medium S/N ratio, nonproblematic overwrite characteristics, a superior bit error rate, and full stability to thermal fluctuation. Further, it is possible to provide a highly reliable magnetic storage device which, when combined with a magnetic head of high sensitivity, can attain a surface recording density of 95 Mbit or more per square millimeter.

BRIEF DESCRIPTION OF THE DRAWINGS

FIG. 2 shows characteristics of heads used in measurement.

FIG. 3 shows electromagnetic conversion characteristics in a working example of the present invention.

FIG. 4 shows electromagnetic conversion characteristics in a working example of the present invention.

FIG. 5 shows electromagnetic conversion characteristics in a working example of the present invention.

FIG. 6 shows electromagnetic conversion characteristics in a working example of the present invention.

FIG. 7 shows electromagnetic conversion characteristics in a working example of the present invention.

FIG. 8 shows characteristics of heads used in measurement for certain samples.

FIG. 9 shows characteristics of heads used in measurement for certain samples.

FIG. 10 shows electromagnetic conversion characteristics in a working example of the present invention.

FIG. 11 shows electromagnetic conversion characteristics in a working example of the present invention.

FIG. 12 shows electromagnetic conversion characteristics in a working example of the present invention.

FIG. 14 is a schematic perspective view showing the structure of the magnetic head.

DETAILED DESCRIPTION OF THE INVENTION

Figure 1:
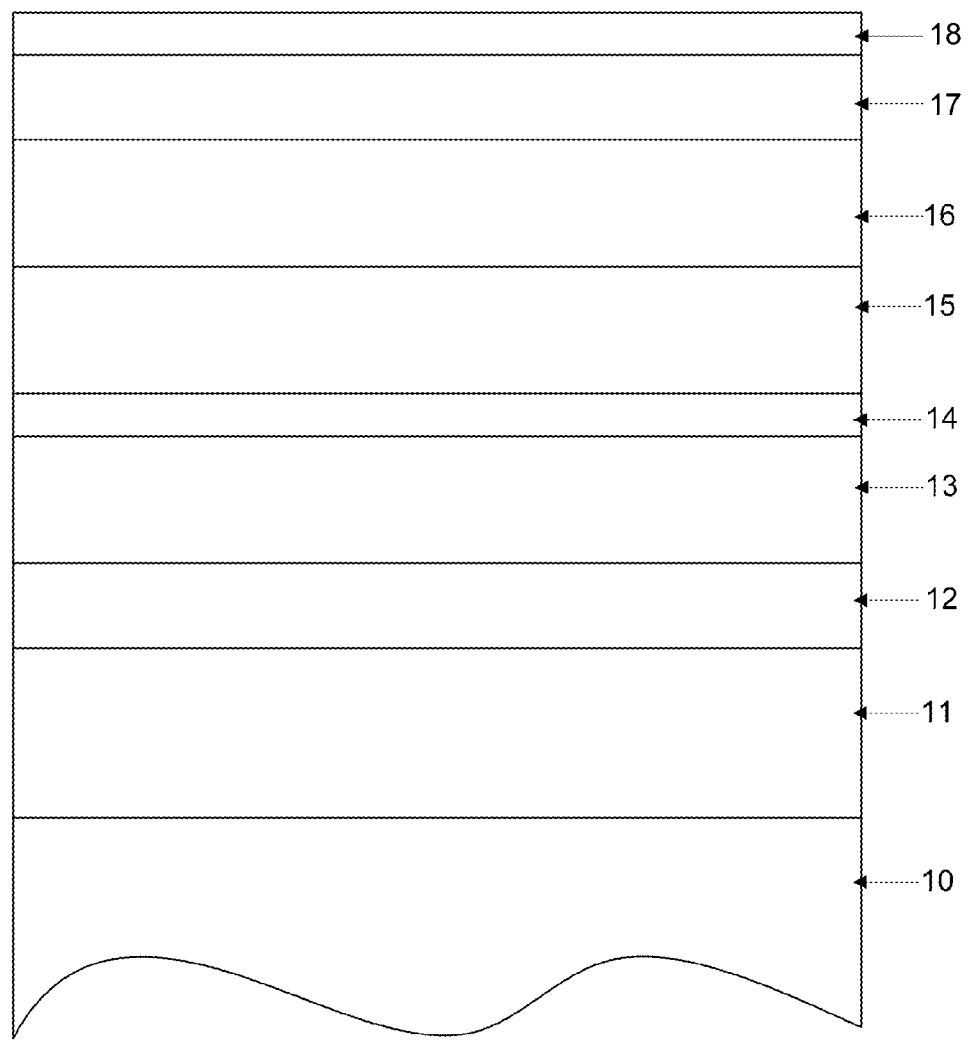
FIG. 1 is a structural sectional view of a magnetic recording medium in a working example of the present invention.
Figure 13:
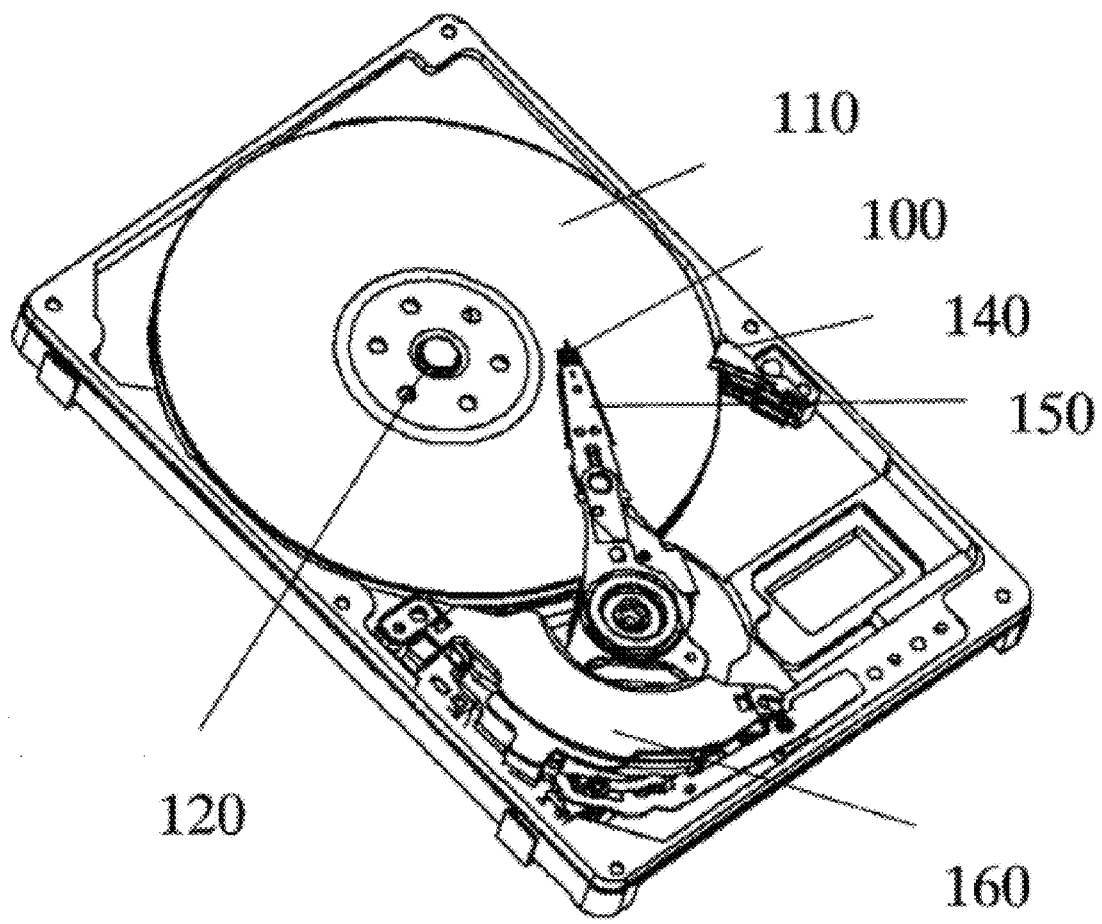
FIG. 13 shows a magnetic disk drive using a magnetic recording medium and a magnetic head according to the present invention.
Figure 1:
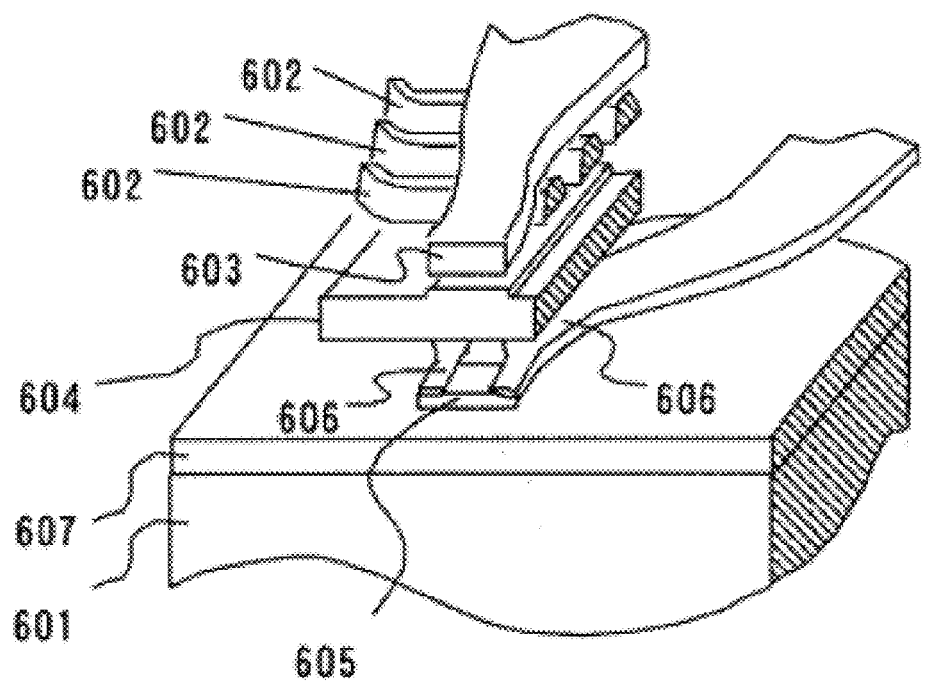

Working examples of the present invention will be described in detail with reference to the drawings. FIG. 13 shows an example of a magnetic storage device to which magnetic recording media and magnetic heads described in the following working examples are applied. The magnetic storage device includes a magnetic recording medium (disk) 110, a disk fixing mechanism 120, a ramp mechanism 140, a voice coil motor (VCM) 160, a head stack assembly (HSA) 150, and a magnetic head 100. FIG. 14 is a schematic perspective view showing the structure of the magnetic head. The magnetic head 100 is a composite head having an inductive head for write and a magnetoresistive head for read both formed on a substrate 601. The recording head includes an upper magnetic pole piece 603 and a combined lower magnetic pole and upper shield layer 604 in a sandwiching relation to coils 602. Write width and write gap length are here designated Tww and Gl, respectively. The read head comprises a magnetoresistive sensor 605 and electrode patterns 606 formed at both ends of the sensor 605. The magnetoresistive sensor is sandwiched in between the combined lower magnetic pole and upper shield layer 604 and a lower shield layer 607. A read track width and the distance between the two shield layers are here designated Twr and Gs, respectively. In this drawing, a gap layer between the magnetic pole pieces and gap layers between the shield layers and the magnetoresistive sensor are omitted. As shown in FIG. 1, the recording medium 110 according to the present invention has a film structure comprising underlying films (11, 12, 13), a plurality of magnetic layers (a first magnetic layer 14, a second magnetic layer 15, a third magnetic layer 16), a protective film 17 and a lubricant film 18 which are deposited in this order on a substrate 10.

As the substrate it is preferable to use a chemically strengthened glass substrate or a rigid substrate formed by plating a phosphorus-containing nickel alloy to an aluminum alloy. To impart magnetic anisotropy it is preferable to apply fine texturing in the substantially circumferential direction of a disc on the substrate. As a result of having measured a surface roughness in the radial direction of the disc under an intermittent contact type atomic force microscope and with respect to the size of 5 µm square, it has turned out that satisfactory flying reliability could be obtained by using a substrate of 2.68 to 4.2 nm in terms of a maximum height Rmax and 0.23 to 0.44 nm in terms of an average surface roughness.

An underlying film is formed between the substrate and the first magnetic layer, whereby it is possible to control the crystallographic orientation of the magnetic film and make crystal grains microfine. Here, a first underlying layer of any one of Ti—Co alloy, Ti—Co—Ni alloy and Ni—Ta alloy, a second underlying layer of W—Co alloy or Ta and a third underlying layer of a body centered cubic structure formed of Cr—Ti—B alloy or Cr—Ti alloy are provided between the substrate and the first magnetic layer.

The plural magnetic layers are stacked in three or more layers without interposition of a non-magnetic layer such as a ruthenium layer. That is, an intermediate layer for antiferromagnetic coupling between magnetic layers is not disposed between the magnetic layers, but magnetic layers are sputtered continuously. The material of the first magnetic layer is a cobalt-based alloy not containing platinum, tantalum and boron all together, such as Co—Cr alloy, Co—Cr—Pt alloy, Co—Cr—B alloy, or Co—Cr—Ta alloy. In particular, a Pt-containing alloy is preferred to stabilize the crystal growth because it is inert even when formed into a thin film.

The concentration of Cr contained in the second magnetic layer may be higher than that of Cr contained in the first magnetic layer and the concentration of Cr contained in the second magnetic layer may be lower than that of Cr contained in the third magnetic layer. In this case, lattice matching between the underlying film and the first magnetic layer is improved and so is lattice matching between the first and second magnetic layers and between the second and third magnetic layers. At the same time, in-plane orientation of magnetic properties is improved and it is also possible to improve the crystallographic orientation. Thus, the concentrations are more preferred for diminishing thermal fluctuation and attaining a high output resolution and a high recording medium S/N ratio.

The coercivity of the recording medium is ensured by incorporating Pt in the second and subsequent magnetic layers. Likewise, by incorporating B in the second and subsequent magnetic layers, the crystal grain size in the magnetic layers is made micro fine and the recording medium noise is reduced.

The magnetic recording medium is formed on the substrate by sputtering a target. As a physical vapor deposition method, not only DC sputtering, but also high-frequency sputtering or DC pulse sputtering is also effective. In a case of adopting the DC sputtering method, it is preferable to apply a bias voltage in the process of forming the second and subsequent magnetic layers to increase the coercivity. In a magnetic storage device comprising the magnetic recording medium fabricated in the above manner, a driver for driving the magnetic recording medium, a magnetic head comprising a write section and a read section, a mechanism for moving the magnetic head relatively with respect to the magnetic recording medium, a mechanical section for unloading the head to a ramp, a signal input unit for the magnetic head, and a read/write signal processing unit for read of an output signal from the magnetic head, if there is used as the magnetic head a magnetic head having a read section constituted by a magnetoresistive sensor, the magnetoresistive sensor including a plurality of electrically conductive magnetic films which undergo a relative change by the action of an external magnetic field and induce a large change in resistance and an electrically conductive non-magnetic film disposed between the electrically conductive magnetic films, it becomes possible to attain a surface recording density of 95 Mbit or more per square millimeter.

EXAMPLE 1

FIG. 1 shows a sectional structure of a magnetic recording medium according to Example 1 of the present invention. An aluminosilicate glass substrate 10 having a chemically strengthened surface was washed with alkali and then dried. Thereafter, a 15-nm-thick layer of Ti-40 at. % Co-10 at. % Ni alloy as a first underlying layer II and a 3-nm-thick layer of W-30 at. % Co alloy as a second underlying layer 12 were formed at room temperature. The substrate was heated with a lamp heater so that the temperature thereof rose to about 400° C., followed by formation of an 8-nm-thick layer of Cr-10 at. % Ti-3 at. % B alloy formed as a third underlying layer 13. Further, a first magnetic layer (M1) 14 of Co-16 at. % Cr-9 at. % Pt alloy having a thickness of 0.6 to 3 nm, a second magnetic layer (M2) 15 of Co-23 at. % Cr-13 at. % Pt-5 at. % B-2 at. % Ta alloy having a thickness of 10 nm and a third magnetic layer (M3) 16 were formed in this order, followed by formation of a 3-nm-thick film as a protective film containing carbon as a main component. After the formation of the carbon film, a 1.8-nm-thick lubricant film 18 was formed by the application of a lubricant containing a perfluoroalkyl polyether as a main component. The following alloys were used for the formation of third magnetic layers:

Co-12 at. % Cr-13 at. % Cr-12 at. % B

Co-18 at. % Cr-13 at. % Cr-8 at. % B

Co-12 at. % Cr-12 at. % Cr-10 at. % B-2 at. % Cu.

The above multi-layer film was formed using a single wafer sputtering apparatus. A base vacuum degree of this sputtering apparatus was $1.0 \sim 1.2 \times 10^{-5}$ Pa and tact was set at 9 seconds. The first underlying layer up to the third magnetic layer were formed in an Ar gas atmosphere of 0.93 Pa. Heating was performed in a mixed gas atmosphere comprising Ar and 1% oxygen added thereto and the protective film of carbon was formed in a mixed gas atmosphere comprising Ar and 10% nitrogen added thereto. During sputtering of the third underlying layer and the second and third magnetic layers, a bias voltage of −200V was applied to the substrate. The discharge time of the first underlying layer and the second and third magnetic layers was set at 4.5 seconds, that of the second underlying layer and the first magnetic layer was set at 2.5 seconds, and that of the third underlying layer was set at 4.0 seconds. Brt (Br: magnetic layer remanence, t: magnetic layer thickness) and remanence coercivity Hcr were evaluated using a Fast Remanent Moment Magnetomer (FRMM) with respect to each recording medium fabricated. KV/kT (K: crystal magnetic anisotropy constant, V: volume of magnetic crystal grains, k: Boltzmann constant, T: absolute temperature) was determined by fitting the time dependency of remanence coercivity from 7.5 to 240 seconds at room temperature into Sharrock's expression with use of a vibrating sample magnetometer (VSM). According to the studies made by the present inventors, if the value of KV/kT obtained by this method is approximately 70 or more, it is possible to suppress output attenuation caused by thermal fluctuation, so that reliability is not affected.

Evaluation of electromagnetic conversion characteristic was made in spin stand mode by combination with a composite head having both an inductive magnetic head for write and a spin valve type magnetic head for read. Characteristics of heads used in this Example and other Examples are shown in FIG. 2. Maximum linear recording density HF (kFC/mm), recording current Iw (mA), sense current Is (mA), write track width Tww (μm), read track width Twr (μm), skew angle Skew (deg.), and the number of revolutions ROTNUM ($s^{-1}$), of each of head samples HEAD No. 1-10 are shown in FIG. 2. Head sample (HEAD No.) 1 was used for evaluation of this Example. Recording was performed at a high recording density HF and normalized noise (kNdhf) was evaluated. A signal to noise ratio Smf/N was determined from an output obtained by recording at a medium recording density MF=HF/2 and a recording medium noise at the high recording density HF. After recording at a low recording density LF=HF/10, a high recording density HF signal was overwritten and an overwrite characteristic 0/W was determined from an attenuation ratio of an LF signal. A bit error rate (BER) was determined by counting the number of error bytes relative to the total number of read bytes when read was performed just after a nearly one-round recording for a specific track using a random pattern. PW50 stands for a half-value width of an isolated read wave.

Evaluation results of SAMPLE No. 101-124 are shown in FIG. 3. In the same figure there are shown Brt (Tnm), Hcr (kA/m), KV/kT, PW50 (nm), 0/W (dB), kNdhf, Smf/N (dB), and a logarithm of BER, logBER, of recording media obtained by changing composition COMP and thickness (TH1, TH3) of each of the first magnetic layer MAGLAY1 and the third magnetic layer MAGLAY3.

For the thickness dependency of the first magnetic layer MAGLAY1, Brt increased with an increase in thickness TH1 of the first magnetic layer MAGLAY1. Hcr became maximum at a thickness of the first magnetic layer of about 0.8 nm and greatly decreased at a first magnetic layer thickness of 1.5 nm or more, thus exhibiting a great decrease with an increase of the thickness. When the thickness of the first magnetic layer was in the range of 1.0 to 1.5 nm, kNdhf decreased to a minimum, Smf/N was improved, and BER became small. Even when the thickness of the first magnetic layer was in the range of about 0.8 to 2.0 nm, there were obtained satisfactory Smf/N and BER close to those obtained at a thickness of 1.0 to 1.5 nm. kNdhf, Smf/N and BER exhibited a conspicuous deterioration at first magnetic layer thicknesses of 0.6 nm and 2.5 nm or more. However, KV/kT was improved with an increase in thickness of the first magnetic layer. In the case where the thickness of the first magnetic layer was as thin as 0.6 nm, it is probable that the deterioration in crystallographic orientation of the second and subsequent magnetic layers grown on the first magnetic layer led to deterioration of the electromagnetic conversion characteristic. It can be said that the conspicuous deterioration at a first magnetic layer thickness of about 2.0 nm or more is because of a great decrease of Hcr.

A comparison will now be made about the composition of the third magnetic layer MAGLAY3 in the case where the thickness of the first magnetic layer is in the range of 1.0 to 1.5 nm. In recording media having a relatively high Cr concentration of the third magnetic layer like test examples (SAMPLE No.) 112 to 114, kNdhf was smaller than in the other compositions. In recording media having a relatively low Cr concentration of the third magnetic layer like test examples (SAMPLE No.) 104 to 106 and 120 to 122, PW50 was smaller than and Smf/N was equal to or higher than in test examples (SAMPLE No.) 112 to 114 having a high Cr concentration. That is, the following facts became clear. In the case of selecting a composition with a high Cr concentration as the composition of the third magnetic layer, it is possible to reduce the recording medium noise, but the output characteristic is deteriorated. Conversely, in the case of selecting a composition with a low Cr concentration as the composition of the third magnetic layer, the output characteristic is improved, but the recording medium noise increases. From a comparison between test examples (SAMPLE No.) 104 to 106 and test examples (SAMPLE No.) 120 to 122, both having an equal Cr concentration, it turned out that test examples (SAMPLE No.) 104 to 106 high in the concentration of B were lower in kDdhf and larger in Smf/N. It is seen that a higher concentration of B is also effective in reducing noise. In the case of adding Cu as in test examples (SAMPLE No.) 120 to 122, it was possible to ensure sufficient Hcr despite the concentration of Pt being low. Thus, it is seen that the addition of Cu is effective in improving Hcr. In this Example, the recording media using Co-12 at. % Cr-13 at. % Pt-12 at. % B as the material of the third magnetic layer exhibited the best BER, but no significant difference was recognized with respect to the other compositions.

Magnetic recording media not having the first magnetic layer were also fabricated, all of which could not afford an output signal in evaluation using FRMM and hence made it impossible to evaluate magnetic properties. This is probably due to the lack of in-plane preferential orientation of the second and third magnetic layers in the absence of any first magnetic layer.

Magnetic recording media not having the third magnetic layer were also fabricated, all of which decreased 100 kA/m or more in Hcr and had a serious problem in thermal stability. This is probably because the second magnetic layer is high in Cr concentration and low in crystal magnetic anisotropy and therefore it became impossible to maintain sufficient coercivity in the absence of the third magnetic layer lower in Cr concentration and higher in crystal magnetic anisotropy than the second magnetic layer.

Therefore, the first magnetic layer is essential for preferential in-plane orientation of the second and third magnetic layers. The formation of a second magnetic layer having a high Cr concentration is effective for the attainment of low Brt and low noise, but a high Cr magnetic layer is low in coercivity and cannot ensure thermal stability. Further, in the case of forming a third magnetic layer higher in Cr concentration than the second magnetic layer, it is also impossible to obtain sufficient coercivity and thermal stability cannot be ensured. Therefore, after the formation of a second magnetic layer having a high Cr concentration, it is necessary to form a third magnetic layer lower in Cr concentration than the second magnetic layer in order to increase coercivity and ensure thermal stability. It is generally known that, in the case of forming a magnetic film by plural magnetic layers, the output characteristic is improved by making the ratio of a ferromagnetic material such as cobalt to a nonmagnetic material such as chromium high in upper layers to increase magnetization. Platinum exhibits ferromagnetism by being incorporated in a cobalt-base alloy. Therefore, by making the concentration of cobalt and that of platinum higher in upper layers than the second magnetic layer, it becomes possible to improve the output characteristic.

The substrate 10 may be a substrate having an outside diameter of 84 mm, inside diameter 25 mm, thickness 1.27 mm, maximum height Rmax 3.5 nm, and average surface roughness Ra 0.35 nm, or a substrate having an outside diameter of 65 mm, inside diameter 20 mm, thickness 0.635 mm, Rmax 2.68 to 4.0 nm, and Ra 0.23 to 0.44 nm. There is no restriction on the shape of the substrate 10. Surface roughness in the radial direction of the disc was determined by observing the size of 5 μm square under an intermittent contact type atomic force microscope.

As the material of the first underlying layer there may be used Ti-50 at. % Co alloy or Ni-38 at. % Ta alloy. From the standpoint of slide reliability it is preferable that the thickness of the first underlying layer be greater than 10 nm. Likewise, from the standpoint of productivity it is preferable that the thickness of the first underlying layer be not greater than about 30 nm. A microcrystalline or amorphous metallic thin film having a composition other than the compositions described above is also employable.

Ta may be used as the material of the second underlying layer. If the second underlying layer is formed too thick, its mechanical reliability will be deteriorated and therefore it is preferable that the thickness of the second underlying layer be 5 nm or smaller.

Cr—Ti alloy not containing B may be used as the material of the third underlying layer. To make crystal grains microfine in a discharge atmosphere in which oxygen and nitrogen are not added intentionally, it is preferable to add boron to the third underlying layer. A suitable concentration of boron to be added can be selected so as to afford a desired value of coercivity. If boron is added in an amount exceeding 10 at. %, the crystal grains will become microfine to an excessive degree.

The first magnetic layer may be an alloy not containing platinum, tantalum and boron all together, such as Co—Cr alloy, Co—Cr—B alloy, Co—Cr—Pt alloy, or Co—Cr—Ta alloy. It is preferable that the concentration of Cr added be in the range of 10 at. % to 20 at. %. In particular, an alloy not containing Pt is preferable in point of stabilizing the crystal growth because the surface thereof is relatively inert even when formed into a thin film.

EXAMPLE 2

Magnetic recording media were formed in the same way as in Example 1 except that the compositions and thicknesses of the first, second and third magnetic layers and the substrate temperature were changed. A Co-12 at. % Cr-14 at. % Pt-4 at. % B-2 at. % Ta alloy having a thickness of 10 nm was formed as the second magnetic layer and a Co-11 at. % Cr-13 at. % Cr-15 at. % B alloy layer having a thickness of 8 nm was formed as the third magnetic layer. The following alloys were used as the materials of first magnetic layers each formed of a Co-base alloy:

Co-16 at. % Cr-9 at. % Pt

Co-34 at. % Cr.

Magnetic properties and electromagnetic conversion characteristic were evaluated in the same manner as in Example 1. Head No. 2 (FIG. 2) was used for the evaluation of electromagnetic conversion characteristic. The results obtained in SAMPLE Nos. 201 to 206 are shown in FIG. 4. In SAMPLE Nos. 204 to 206 wherein Co-34 at. % Cr higher in Cr concentration than the second magnetic layer was used as the first magnetic layer MAGLAY1, Smf/N was deteriorated by about 1 dB and BER was also deteriorated by an order of about 0.5 to 1.0 in comparison with SAMPLE Nos. 201 to 203 in which Co-16 at. % Cr-9 at. % Pt lower in Cr concentration than the second magnetic layer was used as the first magnetic layer MAGLAY1. That is, it can be said that the electromagnetic conversion characteristic is good if the Cr concentration of the first magnetic layer is lower than that of the second magnetic layer.

As comparative examples, magnetic recording media using Cr—Mo alloy layers instead of Co-base alloys of the first magnetic layers were also formed. As Cr—Mo alloys there were provided two compositions of Cr-30 at. % Mo and Cr-40 at. % Mo. Thicknesses of the Cr—Mo alloy layers were set at 1.0 nm, 1.5 nm, and 2.0 nm. In the case of using Cr—Mo alloys, as compared with SAMPLE Nos. 201-206, Brt values of the media lowered by 3 Tnm or more independently of their compositions and thicknesses. This is probably because the magnetic layers overlying the Cr—Mo alloy layers did not exhibit in-plane preferential orientation. The first magnetic layer should be formed of a Co-base alloy in order to attain in-plane preferential orientation of the second and subsequent magnetic layers.

EXAMPLE 3

Magnetic recording media were formed in the same way as in Example 1 except that the compositions and thicknesses of the first underlying layer and the first magnetic layers were changed. As the material of the third magnetic layer there was selected Co-12 at. % Cr-13 at. % Pt-12 at. % B. A Ti-50 at. % Co alloy layer having a thickness of 15 nm was formed as the first underlying layer. The following alloys were used as the materials of first magnetic layers:

Co-10 at. % Cr

Co-14 at. % Cr

Co-27 at. % Cr

Co-14 at. % Cr-4 at. % Pt

Co-14 at. % Cr-8 at. % Pt

Co-14 at. % Cr-12 at. % Pt

Co-19 at. % Cr-8 at. % Pt.

Magnetic properties and electromagnetic conversion characteristic were evaluated in the same manner as in Example 1. Head No. 3 (FIG. 2) was used for the evaluation of electromagnetic conversion characteristic. The results obtained in SAMPLE Nos. 301 to 321 are shown in FIG. 5. In SAMPLE Nos. 307 to 309 wherein Co-27 at. % Cr higher in Cr concentration than the second magnetic layer was used as the first magnetic layer, Smf/N was deteriorated by about 1 to 2 dB and BER was deteriorated by an order of about 1 in comparison with the other test examples wherein the Cr concentration of the first magnetic layer is lower than that of the second magnetic layer. As is the case with Example 2, it turned out that the electromagnetic conversion characteristic was deteriorated at a higher Cr concentration of the first magnetic layer than that of the second magnetic layer.

When a comparison was made with respect to test examples having a Cr concentration of the first magnetic layer of 14 at. %, BER values in SAMPLE Nos. 310 to 315 containing 4 at. % or 8 at. % of Pt were smaller by an order of about 0.2 than in SAMPLE Nos. 304 to 306 not containing Pt. From these results it turned out preferable that the first magnetic layer formed of a Co-base alloy containing Cr further contain Pt. However, in SAMPLE Nos. 316 to 318 containing 12 at. % of Pt, there occurred a slight deterioration in BER, etc. Thus, it turned out that an upper limit was encountered in the concentration of Pt added to the first magnetic layer for improving the electromagnetic conversion characteristic.

EXAMPLE 4

Magnetic recording media were formed in the same way as in Example 1 except that different alloy layers were formed as first magnetic layers. Co-12 at. % Cr-13 at. % Pt-12 at. % B was selected as the material of the third magnetic layer. The following alloys were used as the materials of first magnetic layers:

Co-14 at. % Cr

Co-16 at. % Cr

Co-18 at. % Cr

Co-20 at. % Cr

Co-14 at. % Cr-4 at. % Pt

Co-16 at. % Cr-4 at. % Pt

Co-16 at. % Cr-9 at. % Pt.

Magnetic properties and electromagnetic conversion characteristic were evaluated in the same manner as in Example 1. Head No. 4 (FIG. 2) was used for the evaluation of electromagnetic conversion characteristic. The results obtained in SAMPLE Nos. 401 to 426 are shown in FIG. 6. In SAMPLE Nos. 401 to 416 using Co—Cr alloys as the materials of first magnetic layers, there was no significant difference in kNdhf, Smf/N, and BER. In these test examples, Cr concentrations of first magnetic layers are 14 to 20 at. %, all of which are lower than the Cr concentration of the second magnetic layer. Thus, it turned out that to attain a satisfactory electromagnetic conversion characteristic it was important to set the Cr concentration in each first magnetic layer lower than that of the second magnetic layer.

In SAMPLE Nos. 417 to 426 using first magnetic layers each having a Cr concentration of 14 at. % or 16 at. % and containing 4 at. % or 9 at. % of Pt, BER values were smaller by an order of about 0.5 than in SAMPLE Nos. 401 to 416 not containing Pt in first magnetic layers. As in Example 3, it turned out that the electroconversion characteristic was further improved by the addition of Pt to the first magnetic layers. It also turned out that an upper limit of the concentration of Pt added for the improvement of electromagnetic conversion characteristic was higher than 9 at. %.

EXAMPLE 5

Magnetic recording media were formed in the same way as in Example 1 except that the compositions and thicknesses of the first magnetic layers were changed. Co-12 at. % Cr-13 at. % Pt-12 at. % B was selected as the material of the third magnetic layer. The following alloys were used as the materials of first magnetic layers. Although nonmagnetic materials are included among the following alloys, they are here designated first magnetic layers for convenience:

Co-16 at. % Cr-9 at. % Pt

Co-40 at. % Ru

Co-50 at. % Ru

Co-40 at. % Ru-3 at. % B

Co-24 at. % Ru-14 at. % B

Co-26 at. % Ru-10 at. % B

Co-20 at. % Cr-30 at. % Ru

Co-20 at. % Cr-40 at. % Ru.

Magnetic properties and electromagnetic conversion characteristic were evaluated in the same manner as in Example 1. Head No. 5 (FIG. 2) was used for the evaluation of electromagnetic conversion characteristic. The results obtained in SAMPLE Nos. 501 to 530 are shown in FIG. 7. In SAMPLE Nos. 503 to 530 using first magnetic layers containing Ru, electromagnetic conversion characteristic or magnetic properties were greatly deteriorated in comparison with SAMPLE Nos. 501 and 502 using a first magnetic layer of Co-16 at. % Cr-9 at. % Pt. In SAMPLE Nos. 503 to 510 using Co—Ru alloys as first magnetic layers and SAMPLE Nos. 511 to 514 wherein a small amount of B was added to Co—Ru, relatively good magnetic properties were obtained, but Smf/N was deteriorated by 1 dB or more and BER was also deteriorated by an order of 0.5 or more. In SAMPLE Nos. 515 to 522 using Co—Ru—B alloys containing 10 at. % or more of B as first magnetic layers and also in SAMPLE Nos. 523 to 530 using Co—Cr—Ru alloys as first magnetic layers, Brt and Hcr were greatly deteriorated. That the magnetic properties were greatly deteriorated is due to a marked deterioration in crystallographic orientation of the second and subsequent magnetic layers.

From the above results it can be said that the first magnetic layers not containing Ru afford better magnetic properties and electromagnetic conversion characteristic.

EXAMPLE 6

Magnetic recording media were formed in the same way as in Example 1 except that the composition and thickness of the second magnetic layer and the substrate temperature were changed. The first magnetic layers were formed at a thickness of 1.2 nm. Co-12 at. % Cr-13 at. % Pt-12 at. % B alloy was selected as the material of third magnetic layers. The following alloys were used as the materials of second magnetic layers:

Co-22 at. % Cr-14 at. % Pt-4 at. % B-2 at. % Ta

Co-22 at. % Cr-14 at. % Pt-6 at. % B-2 at. % Ta

Co-24 at. % Cr-14 at. % Pt-6 at. % B

Co-22 at. % Cr-14 at. % Pt-8 at. % B

Co-18 at. % Cr-12 at. % Pt-8 at. % B

Co-20 at. % Cr-12 at. % Pt-8 at. % B.

Figures 10, 11:
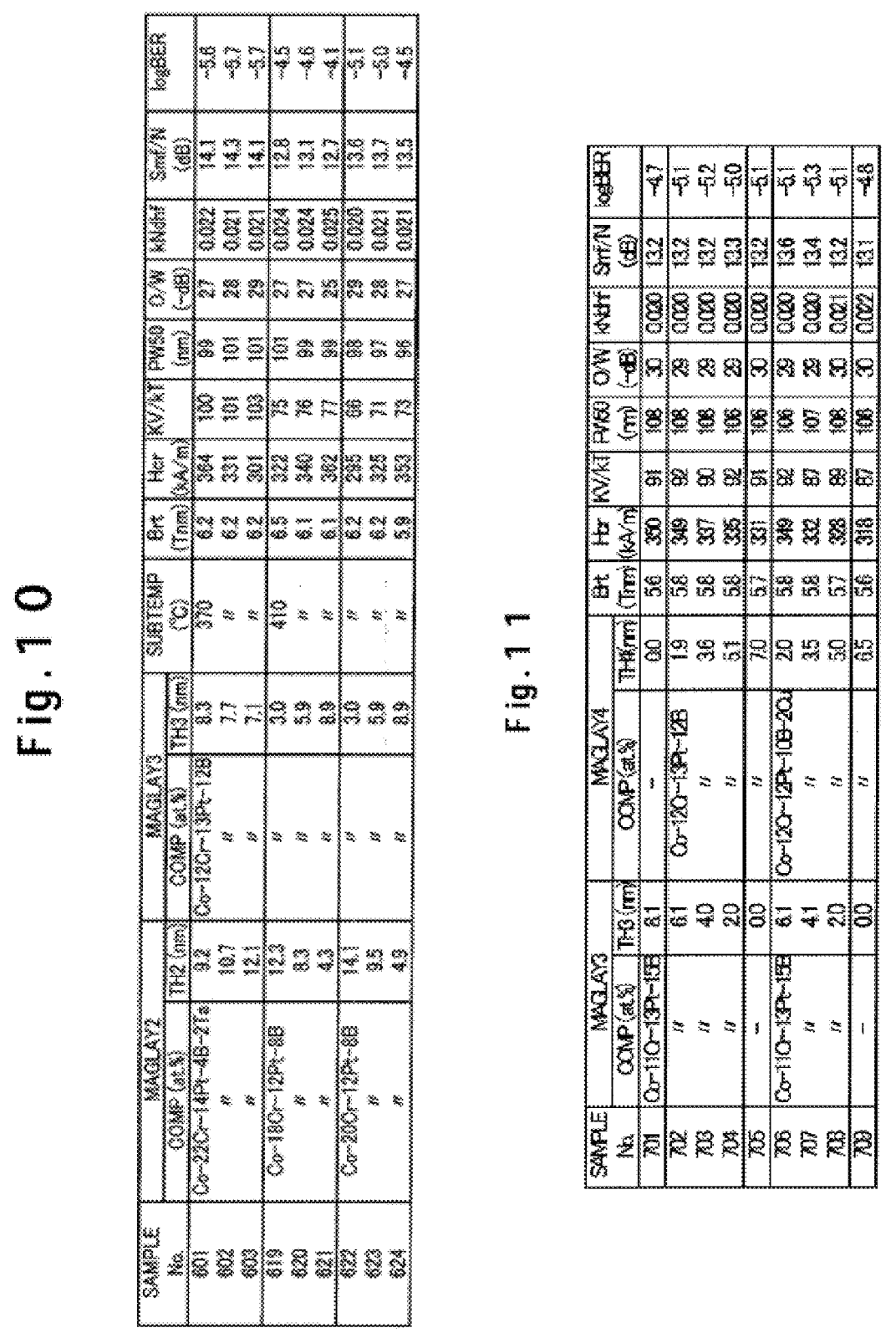

Magnetic properties and electromagnetic conversion characteristic were evaluated in the same manner as in Example 1. The results obtained in SAMPLE Nos. 601 to 606 using Head No. 6 (FIG. 2) are shown in FIG. 8, the results obtained in SAMPLE Nos. 601 to 603 and 613 to 618 using Head No. 7 (FIG. 2) are shown in FIG. 9, and the results obtained in SAMPLE Nos. 601 to 603 and 619 to 624 using Head No. 8 (FIG. 2) are shown in FIG. 10.

SAMPLE Nos. 601 to 606 using Co—Cr—Pt—B—Ta alloys as second magnetic layers were equal in electromagnetic conversion characteristic independently of the concentration of B. In SAMPLE Nos. 604 to 606 using a B concentration of 6 at. %, KV/kT was smaller than in SAMPLE Nos. 601 to 603 using a B concentration of 4 at. %, but the level thereof poses no problem in point of reliability. The reason why the value of KV/kT was small is probably that the crystal grain size of magnetic layers became microfine with an increase of the concentration of B.

In SAMPLE Nos. 613 to 624 using Co—Cr—Pt—B alloys as second magnetic layers and SAMPLE Nos. 613 to 618 having a Cr concentration in second layers of 22 at. % or higher, there were exhibited equal levels of kNdhf, Smf/N and BER to those in SAMPLE Nos. 601 to 603 using Co-22 at. % Cr-14 at. % Pt-4 at. % B-2 at. % Ta alloy as the material of second magnetic layers. SAMPLE Nos. 613-618 were smaller in KV/kT than SAMPLE Nos. 601-603, but the level thereof poses no problem in point of reliability. The reason why KV/kT was small is probably that the crystal grain size of magnetic layers became microfine with an increase of the concentration of B. In SAMPLE Nos. 622 to 624 having a Cr concentration in second layers of 20 at. %, kNdhf values were equivalent to those in the above SAMPLE Nos. 601 to 618, but SmF/N and BER were somewhat deteriorated. In SAMPLE Nos. 619-621 having a Cr concentration in second magnetic layers of 18 at. %, kNdhf, Smf/N and BER were deteriorated in comparison with the other test examples. Thus, it turned out that to reduce noise of each magnetic recording medium it was preferable to set the Cr concentration of the second magnetic layer at about 20 at. % or higher and that for further improvement of Smf/N and BER it was preferable to set the Cr concentration of the second magnetic layer at 22 at. % or higher.

EXAMPLE 7

A first underlying layer of Ti-50 at. % Co alloy having a thickness of 15 nm, a second underlying layer of W-30 at. % Co alloy having a thickness of 3 nm, a third underlying layer of Cr-10 at. % Ti-3 at. % B alloy having a thickness of 8 nm, a first magnetic layer of Co-16 at. % Cr-9 at. % Pt alloy having a thickness of 1 nm, a second magnetic layer of Co-23 at. % Cr-13 at. % Pt-5 at. % B-2 at. % Ta alloy having a thickness of II nm, and a third magnetic layer of Co-11 at. % Cr-13 a. % Pt-15 at. % B alloy were formed in this order on a substrate in the same way as in Example 1, followed by further formation of a fourth magnetic layer. After the formation of the fourth magnetic layer, a protective layer and a lubricant layer were formed in the same manner as in Example 1. The following alloys were used as the materials of fourth magnetic layers:

Co-12 at. % Cr-13 at. % Pt-12 at. % B

Co-12 at. % Cr-12 at. % Pt-10 at. % B-2 at. % Cu.

Magnetic properties and electromagnetic conversion characteristic were evaluated in the same manner as in Example 1. Head No. 9 (FIG. 2) was used for the evaluation of electromagnetic conversion characteristic. The results obtained in SAMPLE Nos. 701 to 709 are shown in FIG. 11. In SAMPLE Nos. 702 to 704 and 706 to 708 each having a total of four magnetic layers, Smf/N and BER were somewhat improved in comparison with recording media each having a total of three magnetic layers like SAMPLE No. 701 wherein a fourth magnetic layer was not formed and like SAMPLE Nos. 705 and 709 wherein a fourth magnetic layer was formed without forming a third magnetic layer. It is probable that the output characteristic, as well as Smf/N and BER, was improved by forming a fourth magnetic layer high in the concentration of Co and that of Pt and of large magnetization. Thus, it turned out that even in a magnetic recording medium having four or more magnetic layers, the output characteristic and electromagnetic conversion characteristic could be improved by setting high the sum of the concentration of cobalt and of platinum in the layers above the second magnetic layers.

EXAMPLE 8

Magnetic recording media were formed in the same way as in Example 7 except that different alloy layers were formed as third and fourth magnetic layers. The following alloys were used as the materials of third magnetic layers:

Co-12 at. % Cr-13 at. % Pt-12 at. % B

Co-18 at. % Cr-13 at. % Pt-8 at. % B.

The following alloys were used as the materials of fourth magnetic layers:

Co-6 at. % Cr-13 at. % Pt-16 at. % B

Co-8 at. % Cr-13 at. % Pt-16 at. % B

Co-8 at. % Cr-13 at. % Pt-14 at. % B

Co-8 at. % Cr-13 at. % Pt-12 at. % B

Co-10 at. % Cr-13 at. % Pt-14 at. % B

Co-10 at. % Cr-13 at. % Pt-12 at. % B

Co-10 at. % Cr-13 at. % Pt-10 at. % B

Co-12 at. % Cr-13 at. % Pt-10 at. % B

Co-10 at. % Cr-6 at. % Pt-4 at. % B.

Figure 12:
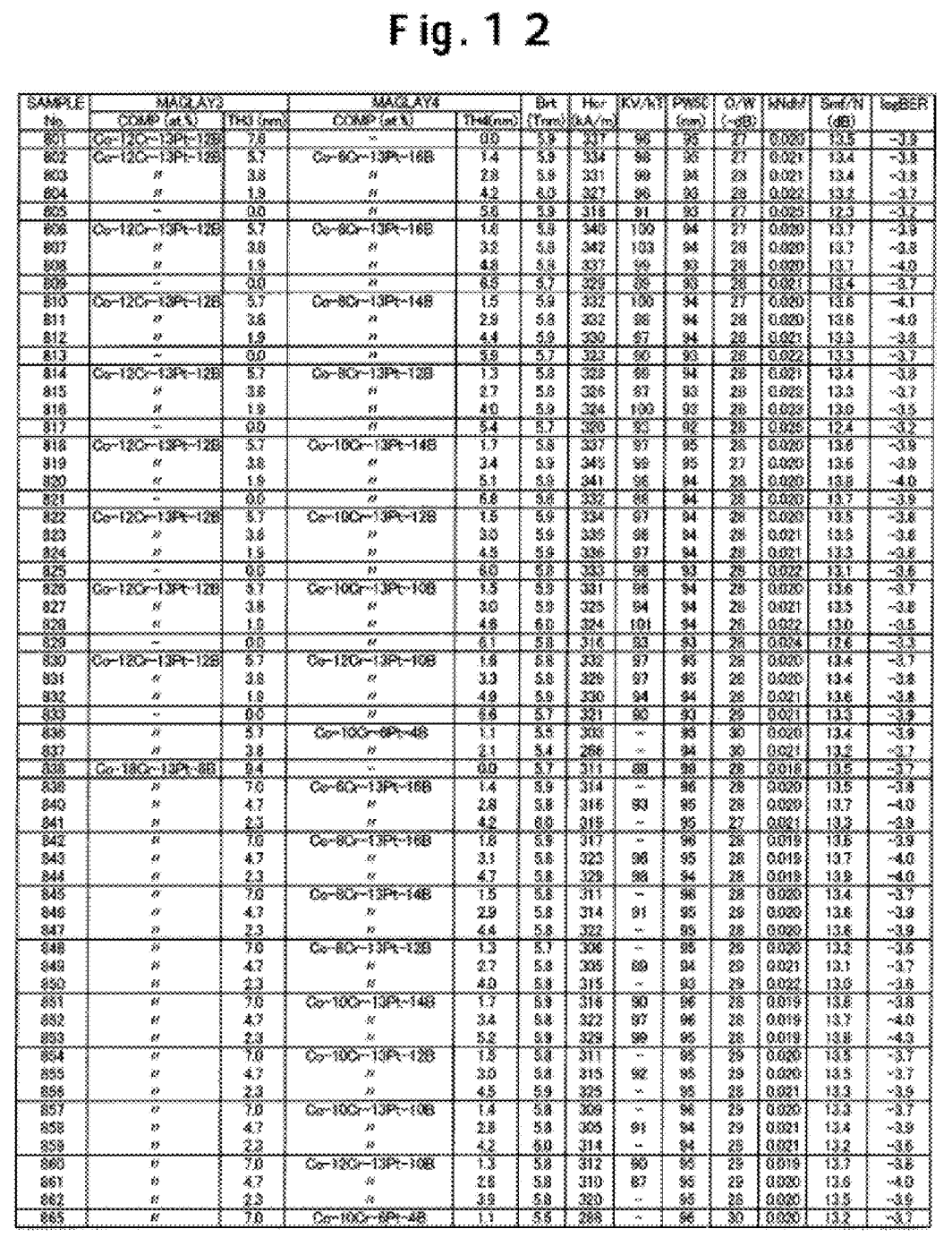

Magnetic properties and electromagnetic conversion characteristic were evaluated in the same manner as in Example 1. Head No. 10 (FIG. 2) was used for the evaluation of electromagnetic conversion characteristic. The results obtained in SAMPLE Nos. 801 to 865 are shown in FIG. 12. Among the magnetic recording media formed in this Example, in all of those each having four magnetic layers, approximately equal values of Smf/N and BER were obtained. All the magnetic recording media each having four magnetic layers in this Example are characterized by a fourth magnetic layer having a larger sum of the concentration of Co and of Pt than in a third magnetic layer. It is seen that these magnetic recording media each having four magnetic layers are smaller in PW50 than and improved in output characteristic over the magnetic recording media each having three magnetic layers such as SAMPLE Nos. 801 and 838. From a comparison of fourth magnetic layer compositions it is seen that in the compositions having a Cr—B concentration sum of 22 at. % or lower, i.e., in the compositions having a Co—Pt concentration sum of 78 at. % or higher, kNdhf increased a little in comparison with the compositions having a Co—Pt concentration sum of 76 at. % or lower. From the standpoint of reducing noise it can be said that there is an upper limit as to the sum of the concentration of Co and that of Pt in each fourth magnetic layer.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording medium comprising an underlying film, a magnetic film and a protective film, which are formed in order on a substrate; wherein:
   said magnetic film is a cobalt-base alloy film containing chromium and having a plurality of magnetic layers stacked without interposition of any non-magnetic layer;
   said plurality of magnetic layers comprising first, second and third magnetic layers;
   said first magnetic layer is disposed between said underlying film and said second magnetic layer;
   said second magnetic layer being disposed between said first magnetic layer and said third magnetic layer;
   said third magnetic layer being disposed between said second magnetic layer and said protective film;
   the concentration of chromium contained in said first magnetic layer is lower than that of chromium contained in said second magnetic layer;
   the first magnetic layer containing platinum; and
   the concentration of chromium contained in said third magnetic layer is lower than the concentration of chromium contained in said second magnetic layer.

2. A magnetic recording medium according to claim 1, wherein the sum of the concentration of cobalt and the concentration of platinum contained in said third magnetic layer is higher than the sum of the concentration of cobalt and the concentration of platinum contained in said second magnetic layer.

3. A magnetic recording medium according to claim 2, wherein a thickness of said first magnetic layer is not smaller than about 0.8 nm and not larger than about 2.0 nm.

4. A magnetic recording medium according to claim 2, wherein the concentration of chromium contained in said first magnetic layer is not lower than about 10 at. % and not higher than about 20 at. %.

5. A magnetic recording medium according to claim 2, wherein said first magnetic layer having a platinum concentration of not higher than about 12 at. %.

6. A magnetic recording medium according to claim 2, wherein said first magnetic layer is a cobalt-chromium-platinum layer.

7. A magnetic recording medium according to claim 2, wherein the concentration of chromium contained in said second magnetic layer is not lower than about 20 at. %.

8. A magnetic recording medium according to claim 1,
   wherein said plural magnetic layers further comprise a fourth magnetic layer formed over and in contact with said third magnetic layer; and
   wherein the sum of the concentration of cobalt and the concentration of platinum contained in said third magnetic layer is lower than the sum of the concentration of cobalt and the concentration of platinum contained in said fourth magnetic layer.

9. A magnetic recording medium comprising at least a first magnetic layer, a second magnetic layer and a third magnetic layer, which are formed in order on a substrate through an underlying film; wherein:
said first magnetic layer is a cobalt-chromium-platinum alloy layer;
said second and third magnetic layers are each a cobalt-base alloy layer containing chromium, and platinum;
the concentration of chromium contained in said first magnetic layer is lower than the concentration of chromium contained in said second magnetic layer; and
the concentration of chromium contained in said third magnetic layer is lower than the concentration of chromium contained in said second magnetic layer.

10. A magnetic recording medium according to claim 9, wherein the
sum of the concentration of cobalt and the concentration of platinum contained in said second magnetic layer is lower than the sum of the concentration of cobalt and the concentration of platinum contained in said third magnetic layer.

11. A magnetic recording medium according to claim 10, wherein the thickness of said first magnetic layer is not smaller than about 0.8 nm and not larger than about 2.0 nm, the concentration of chromium contained in said first magnetic layer is not lower than about 10 at. % and not higher than about 20 at. %, and the concentration of platinum contained in said first magnetic layer is not higher than about 12 at. %; and
wherein the concentration of chromium contained in said second magnetic layer is not lower than about 20 at. %.

12. A magnetic recording medium according to claim 9, further comprising a fourth layer formed over and in contact with said third magnetic layer;
wherein said fourth magnetic layer is a cobalt-base alloy layer containing chromium and platinum, and
wherein the sum of the concentration of cobalt and the concentration of platinum contained in said fourth magnetic layer is higher than the sum of the concentration of cobalt and the concentration of platinum contained in said third magnetic layer.

13. A magnetic recording medium comprising, on a substrate, an underlying film, a magnetic film and a protective film; wherein:
said magnetic film has a plurality of magnetic layers stacked without interposition of any non-magnetic layer;
said plurality of magnetic layers comprises first, second, third and fourth magnetic layers;
said first magnetic layer is disposed between said underlying film and said second magnetic layer;
said second magnetic layer is disposed between said first magnetic layer and said third magnetic layer;
said third magnetic layer is disposed between said second magnetic layer and said fourth magnetic layer;
said fourth magnetic layer is disposed between said third magnetic layer and said protective film;
said first magnetic layer is a cobalt-base alloy layer containing chromium;
said second, third and fourth magnetic layers are each a cobalt-base alloy layer containing chromium and platinum;
the concentration of chromium contained in said first magnetic layer is lower than the concentration of chromium contained in said second magnetic layer;
the concentration of chromium contained in said third magnetic layer is lower than the concentration of chromium contained in said second magnetic layer; and
the sum of the concentration of cobalt and the concentration of platinum contained in said fourth magnetic layer is higher than the sum of the concentration of cobalt and the concentration of platinum contained in said third magnetic layer.

14. A magnetic recording medium according to claim 13, wherein the thickness of said first magnetic layer is not smaller than about 0.8 nm and not larger than about 2.0 nm, said first magnetic layer further contains platinum, the concentration of chromium contained in said first magnetic layer is not lower than about 10 at. % and not higher than about 20 at. %, and the concentration of platinum contained in said first magnetic layer is not higher than 1 about 2 at. %; and
wherein the concentration of chromium contained in said second magnetic layer is not lower than about 20 at. %.

15. A magnetic recording medium according to claim 13, wherein the thickness of said first magnetic layer is not smaller than about 0.8 nm and not larger than about 2.0 nm.

16. A magnetic recording medium according to claim 13, wherein a concentration of chromium contained in said first magnetic layer is not lower than about 10 at. % and not higher than about 20 at. %.

17. A magnetic recording medium according to claim 13, wherein said first magnetic layer further contains platinum at a platinum concentration of not higher than about 12 at. %.

18. A magnetic recording medium according to claim 13, wherein said first magnetic layer is a cobalt-chromium alloy layer or a cobalt-chromium-platinum layer.

19. A magnetic recording medium according to claim 13, wherein the concentration of chromium contained in said second magnetic layer is not lower than about 20 at. %

* * * * *

UNITED STATES PATENT AND TRADEMARK OFFICE
CERTIFICATE OF CORRECTION

PATENT NO. : 7,876,530 B2
APPLICATION NO. : 12/387164
DATED : January 25, 2011
INVENTOR(S) : Hinoue et al.

It is certified that error appears in the above-identified patent and that said Letters Patent is hereby corrected as shown below:

Title Page; item (75);
replace inventor name "Jo Inagaki" with --Joe Inagaki--;
replace inventor name "Hiroyuki Suzuki" with --Hiroyuko Suzuki--.

Signed and Sealed this
Third Day of May, 2011

David J. Kappos
*Director of the United States Patent and Trademark Office*